United States Patent [19]
Sugisaki et al.

[11] 3,767,533
[45] Oct. 23, 1973

[54] PROCESS FOR PRODUCING URICASE

[75] Inventors: Zenjiro Sugisaki; Norihiko Watanabe; Hirokazu Koyama, all of Noda; Tuneo Kobayashi, Nagareyama; Nobuyoshi Iguchi, Noda, all of Japan

[73] Assignee: Noda Institute for Scientific Research, Noda-shi, Japan

[22] Filed: Dec. 23, 1971

[21] Appl. No.: 211,711

[30] Foreign Application Priority Data
Dec. 26, 1970  Japan............................... 45/118750
Dec. 28, 1970  Japan............................... 45/119989

[52] U.S. Cl............................................. 195/66 R
[51] Int. Cl............................................ C12d 13/10
[58] Field of Search....................... 195/65, 66 R, 62

[56] References Cited
UNITED STATES PATENTS
3,620,923  11/1971  Laboureur et al................ 195/66 R
3,002,889  10/1961  Kinoshita et al...................... 195/47

OTHER PUBLICATIONS
Kida et al., Chemical Abstracts Vol. 68 113316e (1968).

Primary Examiner—Lionel M. Shapiro
Attorney—Cushman, Darby & Cushman

[57] ABSTRACT

Uricase is produced by incubating Corynebacterium uratoxidans nov.sp. U-23 (ATCC No. 21749), U-8 (ATCC No. 21750), U-30 (ATCC No. 21751) or U-125 (ATCC No. 21752) in a medium containing 0.01 to 1.0% (W/V) of uric acid and preferably 0.1 to 3.0% (V/V) of at least one of alcohols having 1 to 8 carbons at a pH of 5.5 to 9.0 and a temperature of 20° to 40°C under aerobic conditions, thereby producing and accumulating the extracellular uricase in the surrounding medium and recovering the same from the cultured broth. The uricase is useful as a reagent for biochemical diagnosis.

7 Claims, No Drawings

PROCESS FOR PRODUCING URICASE

This invention relates to a process for producing uricase (urate: oxygen oxidoreductase, EC 1.7.3.3) by a microorganism belonging to the genus Corynebacterium and being capable of producing uricase, and more particularly to a process for producing uricase, which comprises incubating said microorganism in a medium containing uric acid and preferably at least one alcohols thereby to increase the productivity of uricase, secreting and accumulating uricase efficiently outside the cells of the microorganisms and recovering the same.

It is known that uricase is an enzyme capable of decomposing uric acid by oxidation to allantoin, and now plays an important role in the medical field, especially in the biochemical diagnosis when used as a reagent for quantitative determination of uric acid in serum or urine.

However, the supply source of uricase has been so far mainly animal organs, and there have been many difficulties in its extraction and purification. As a countermeasure, it has been attempted to produce uricase by using microorganisms. As the microorganisms, yeasts belonging to the genus Candida [Agricultural and Biological Chemistry, 31, 1256 (1967)], bacteria belonging to the genus Micrococcus and the genus Brevibacterium ]Journal of Fermentation Technology (Japan), 44, 789 (1966)], bacteria belonging to the genus Arthrobacter (Japanese Patent Publication No. 8062/69), bacteria belonging to the genus Pseudomonas [Journal of General Microbiology, 17, 1 (1957)], the genus Streptomyces [Journal of the Agricultural Chemical Socity of Japan, 41, 540 (1967)], fungi belonging to the genus Neurospora [Archives of Biochemistry and Biophysics, 70, 603 (1957)], etc. have been known.

However, uricase originating from these microorganisms is an enzyme inductively produced in the presence of uric acid, and in general, the biosynthesis of uricase is readily influenced by the surrounding conditions. Furthermore, these strains accumulate uricase substantially within the cells, and so as to isolate the enzyme, it is necessary to subject the cells to milling, lysis, or other treatments. Therefore, the production of uricase by these strains are based on a three-step process comprising a step for cultivating cells, a step for inductively producing uricase in the presence of uric acid after harvest of the cultivated cells, and a step for separating the uricase produced within the cells. According to the three-step process, the separation and purification of uricase are considerably complicated, because various kinds of proteins and other enzymes are involved therein in large amounts, and its production efficiency is low.

The present inventors have investigated to isolate those strains capable of inductively producing stable uricase with a good yield in a nutrient sufficient circumstances at the ordinary temperature, in order to establish a one-step process for carrying out the cultivation of cells, inductive production of the enzyme and secretion of the enzyme to the outside of the cells at the same time. The present inventors have succeeded in finding new strains suitable for one-step process desired among the microorganisms belonging to the genus Corynebacterium. Further, the present inventors have studied the conditions for producing uricase by these new strains in detail, and have succeeded in that the production efficiency of uricase can be considerably enhanced by adding an alcohol to the medium. The present invention has been accomplished on the basis of these findings.

That is to say, an object of the present invention is to provide a process for producing uricase, which comprises inoculating a microorganism belonging to the genus Corynebacterium and being capable of producing uricase in the ordinary nutrient medium containing uric acid, an alcohol or alcohols being preferably added to the medium, incubating the microorganisms under aerobic conditions thereby to produce and accumulate uricase in the medium outside the cells and recovering the uricase from the medium.

Recently, a one-step process for producing uricase by *Bacillus fastidiosus* has been reported [Analytical Biochemistry, 38, 65 (1970)]. According to the process not only a large amount of inducer (uric acid) and nutrient sources is required, but also the incubation time is prolonged and the yield of uricase is low. On the other hand, in the present invention, a microorganism belonging to the genus Corynebacterium is used, and there are such advantages that the inducer and nutrient sources are used at low concentrations and the incubation time can be shortened, as compared with the prior art one-step process, though the yield of uricase is considerably high.

According to the present invention, stable uricase can be obtained readily with a high purity and in good yield within a short period of time by fermentation. Any strain, variant or mutant can be used in the present invention, so long as it is a strain belonging to the genus Corynebacterium and being capable of producing uricase. As the strains belonging to the genus Corynebacterium, a group of bacteria represented by *Corynebacterium uratoxidans* U-23, FERM-P No. 789, ATCC No. 21749 can be mentioned, wherein the abbreviation "FERM-P " stands for the access number registered by Fermentation Research Institute, Agency of Industrial Science and Technology, 5-chome 8-1, Inage, Chiba-shi, Japan, a public depository of Japan; and ATCC stands for the access number issued by American Type Culture Collection, 12301 Parklawn Drive, Rockville, Maryland, USA, a public depository of the USA.

The strain Corynebacterium uratoxidans U-23 FERM-P No. 789, ATCC No. 21749 is a novel strain isolated from a humus soil by the present inventors, and its microbiological properties are described below. The microbiological properties were determined according to the test procedures described in "Manual of Microbiological Methods (Society of American Bacteriologists, McGraw-Hill Book Company, Inc. New York, 1957)."

A. Microscopic observations (0 to 48 hr. incubation on nutrient agar at 30°C).
1. Cell morphorogy:
   i. Straight to slightly curved or ellipsoidal rods with metachromatic granules.
   ii. Pleomorphic rods, which are club-shaped swellings, naive branching forms, slightly curved rods and angular or palisade forms by snapping division, were observed in an early stage of incubation.
   iii. Varying greatly in dimension, 0.8 to 1.2 by 1 to 5 microns.
2. Flagella: absent.
3. Capsules: absent.

4. Motility: absent.
5. Endospores: absent.
6. Gram stain: positive.
7. Acid-fast staining: negative.

B. Cultural characteristics.
1. Agar colony (24 hr. incubation on nutrient agar at 30°C.):
Circular, flat, smooth, entire, slightly glistening and opaque, 3 to 4 mm in diameter.
2. Agar stroke (24 hr. incubation on nutrient agar at 30°C.):
Filiform or slightly spreading, moderate growth. Creamy white in young culture to pale yellow in late.
3. Nutrient broth (24 hr. incubation at 30°C.):
Scanty, surface growth with ring and no sediments.
4. Gelatin stab (4 – 5 days incubation at 20°C.):
Best growth at top and filiform.
Liquefy gelatin with stratiform.
5. Litmus milk (24 hr. incubation at 30°C.): No reduction, slightly alkaline and no coagulation.

C. Physiological characteristics.
1. Action on nitrates: reduced.
2. Methyl red test: negative or slightly positive.
3. Voges-Proskauer test: negative.
4. Indole production: negative.
5. Hydrogen sulfide production: positive.
6. Hydrolysis of starch: negative or weak.
7. Utilization of sodium citrate (Koser's and Christensen's medium) positive.
8. Utilization of organic nitrogen: positive.
9. Chromogenesis: Water insoluble, pale yellowish brown pigments produced.
10. Urease: negative.
11. Oxidase: positive.
12. Catalase: positive.
13. pH relations:
pH range for growth; pH 5 to 9.5.
Optimum pH; pH 7 to 8.
14. Temperature relations (shake culture in nutrient broth):
i. Optimum temperature for growth; 27° – 35°C.
ii. Maximum temperature; 37° – 40°C. (no growth at 42°C.)
iii. Minimum temperature: 15°C.
iv. Thermal death time (shake culture in skim milk): 10 min. at 52°C. but not die for 10 min. at 50°C.
15. Relation to free oxygen:
Aerobic or slightly facultative anaerobic.
16. Hemolysis: negative.
17. Pathology: absent.
18. Cleavage of sugars, alcohols and glucosides:

TABLE

| | Acid production | Gas production |
|---|---|---|
| 1. arabinose | − | − |
| 2. xylose | − | − |
| 3. glucose | ++ | − |
| 4. mannose | − | − |
| 5. fructose | ++ | − |
| 6. galactose | − | − |
| 7. maltose | + | − |
| 8. sucrose | − | − |
| 9. lactose | − | − |
| 10. trehalose | + | − |
| 11. sorbitol | ± | − |
| 12. mannitol | ± | − |
| 13. inositol | ± | − |
| 14. glycerin | ± | − |
| 15. starch | ± | − |
| 16. dextrin | ± | − |
| 17. inulin | ± | − |
| 18. raffinose | ± | − |
| 19. glycogen | − | − |
| 20. salicin | ± | − |

19. Physiologically remarkable characteristics: This strain has a strong activity to form uricase inductively, and to accumulate the enzyme in the surrounding medium.

When the foregoing characteristics are reviewed according to the classification of "Bergey's Manual of Determinative Bacterilogy, 7th edition (1957)," it is appropriate to classify the present microorganism into the genus Corynebacterium, but the species of the present microorganism cannot be identified with any known species. Therefore, the present microorganism has been deemed as a new species. The reasons for the new species will be explained in detail hereunder:

The present microorganism is a Gram-positive, aerobic, non-spore-forming small rod with metachromatic granules, exhibiting pleomorphism and snapping division. Thus, it is classified into the family Corynebacteriaceae. Furthermore, the present microorganism is non-pathogenic and non-hemolylic, non-flagella and non-motile, and exhibits no filamentous form. Further, it is incapable of decomposing cellulose, undergoes no change in Gram staining and has the ordinary heat tolerance. Therefore, it is appropriate to classify the present microorganism into the genus Corynebacterium. Furthermore, the source for isolating the present microorganism is not of animal origin, but of vegetable origin, and the present microorganism can reduce the nitrate to nitrite and liquefy the gelatin. Thus, it seems that the present microorganism is analogous to Corpynebacterium rathayi or Corynebacterium agropyri, but as shown in the following table for comparison, the present microorganism is considerably distinguished from said analogous species not only in the ability to liquefy the gelatin, which is the important criterion in classification of the analogous microorganisms, but also in other physiological characteristics. Since it was difficult to classify the present microorganism into any of said species, and as already described the present microorganism has a strong activity to oxidatively decompose uric acid, the present inventors named this new species as Corynebacterium uratoxidans nov. sp. and called the strain U-23 "Corynebacterium uratoxidans U-23 (FERM-P No. 789, ATCC No. 21749)."

Comparison of Corynebacterium uratoxidans U-23 (FERM-P No. 789, ATCC No. 21749) with the closely related microorganisms

| Item | Present microorganism (ATCC No. 21749) | Corynebacterium rathayi | Corynebacterium agropyri |
|---|---|---|---|
| 1. Gelatin liquefaction | Strongly liquefied | Slowly liquefied | not liquefied |
| 2. Gram stain | positive | positive | variable |
| 3. Growth in nutrient broth | moderate | poor | moderate |
| 4. Growth in litmus milk | became alkaline, non-reductive, brown, ring | became alkaline, reductive, yellow, ring | not changed, sediments |
| 5. Cleavage of sugars | | | |
| glucose | + | + | + |
| Lactose | − | + | + |
| Sucrose | − | + | + |
| 6. Hydrolysis of starch | − | not described | + |

Further, the present inventors successively isolated novel uricase-producing microorganisms such as *Corynebacterium uratoxidans* U-8 (ATCC No. 21750), *Corynebacterium uratoxidans* U-30 (ATCC No. 21751), and *Corynebacterium uratoxidans* U-125 (ATCC No. 21752) from the natural source. Though there are small differences in the minor characters as shown in the following table, these strains are all coryne-form bacteria and have a peculiar character in common to produce uricase in good yield. These strains are not different from said *Corynebacterium uratoxidans* U-23 (FERM-P No. 789, ATCC No. 21749) in other taxonomically important physiological characteristics. Therefore, the present inventors identified these uricase-producing strains as bacteria belonging to the species *Corynebacterium uratoxidans*. Herein present inventors have designated the strain U-23 (FERM-P No. 789, ATCC No. 21749) as a type culture of *Corynebacterium uratoxidans*.

Comparison of taxomical characters of Coryne-form uricase-producing strains

| Characters | U-23 (ATCC No. 21749) | U-8 (ATCC No. 21750) | U-30 (ATCC No. 21751) | U-125 (ATCC No. 21752) |
|---|---|---|---|---|
| Motility | absent | absent | absent | absent |
| Flagella | absent | absent | absent | absent |
| Action on nitrate | strongly reduced | strongly reduced | strongly reduced | strongly reduced |
| Chromogenesis* | slightly yellow | slightly yellowish brown | slightly creamy | greyish white |
| Liquefaction of gelatin | strongly liquefied | strongly liquefied | strongly liquefied | strongly liquified |
| Appearance* of colony | circular, flat, slightly glistening | circular, raised, slightly glistening | circular, raised, lusterous | circular, flat, lusterous (butyrous) |

Note: * Observations on nutrient agar

The uricase production by these strains is carried out, in usual, by submarged culture.

Any kind of carbon- and nitrogen-sources can be used in the medium, so long as they can be utilized by the present uricase-producing strains. That is, glycerine, glucose, fructose, xylose, arabinoze, mannose, galactose, sucrose, maltose, lactose, mannitol, dextrin, starch hydrolyzate, molasses, etc. can be used alone or in combination as carbon source. Various inorganic and organic ammonium salts such as ammonia, urea, ammonium chloride, ammonium nitrate, ammonium acetate, etc. can be used as nitrogen sources. Further, natural organic nutrients are effective for the growth of the present microorganism and efficient production of uricase, when supplied adequately. That is, yeast extract, peptones, meat extract, casein hydrolyzate, corn-steep liquor, fish meal or its digested materials, steep liquor of soybeans or wheat bran, steep liquor of humus soil, etc. can be used alone or in combination. Furthermore, it is necessary to use potassium phosphate (monobasic), potassium phosphate (dibasic), magnesium sulfate, magnesium chloride, ferric or ferrous chloride, ferric or ferrous sulfate, etc. at a proper concentration in combination, but other kind of inorganic salts can be properly used.

The heretofore well known microorganisms capable of producing uricase within the cells have such a tendency that the inductive production of the uricase is inhibited by the presence of inorganic nitrogen sources and organic nutrient sources. On the other hand, in the one-step process of the present invention using the present strains, it is a surprising fact that the production efficiency of uricase can be enhanced by properly using these inorganic and/or organic nitrogen sources.

An example of the preferable medium used in the present invention has the following composition in W/V.

0.1–5 % glycerine
0.01–0.5 % potassium phosphate (monobasic)
0.01–0.1 % magnesium sulfate
0.0005–0.005 % ferric chloride
0.01–1 % yeast extract pH of the medium is 5.5 to 9.0, preferably neutral to a slightly alkaline side (pH 6.5 to 8.0).

In carrying out the incubation according to the present invention, the present strains are cultivated in a medium having said composition at 25° to 40°C for 12 to 24 hours to obtain a seed culture. Then, the seed culture is inoculated onto a medium having said composition, thereafter a main cultivation is carried out. Before or after the start of main cultivation, 0.01 to 1.0 % (W/v) of uric acid is added to the medium. Preferably, uric acid is added to the medium within 0 to 8 hours, more preferably within 5 hours from the start of main cultivation.

Incubation can be carried out at any temperature so long as the microorganism can grow. Particularly, the incubation temperature of 20° to 40°C, preferably 32° to 37°C, is used in the present invention.

It is usually preferable in view of the remarkable production of stable uricase to incubate the present strain for 30 to 50 hours after the addition of uric acid.

The incubation is carried out under aerobic conditions by submerged culture or shake culture. Throughout the one-step fermentation, the present strains can form a considerable amount of uricase and accumulate it not only within the cells but also outside the cells.

The strains of the present invention have a very strong ability to inductively produce uricase, and the uricase obtained within the cells of the strains have an activity equivalent or superior to that of the uricase obtained from the strains used in the prior art three-step process. Therefore, it is also very effective to recover the intracellular uricase.

Furthermore, when alcohols having one to eight carbons are added to said medium in the production of uricase by these uricase-producing strains, the production efficiency of uricase is considerably enhanced, and uricase can be secreted and accumulated outside the cells with a high efficiency. The cultivation can be carried out in the same manner as above, except that the alcohols are added to the medium at the main cultivation.

The alcohols can be added to the medium before or after the addition of uric acid, and it is not always necessary to add the uric acid and alcohols to the medium at the same time. The incubation in the media including alcohols can be carried out preferably for 20 to 40 hours after the addition of uric acid.

Owing to the addition of the alcohols, the production of uricase can be considerably improved and the incubation time can be shortened, as compared with the production of uricase when no alcohols are added to the medium. Furthermore, a large amount of uricase can be produced and accumulated outside the cells thereby.

As the alcohols, such alcohols having 1 to 8 carbons as methyl alcohol, ethyl alcohol, propyl alcohol, butyl alcohol, amyl alcohol, hexyl alcohol, heptyl alcohol, octyl alcohol and their isomers, preferably alcohols having 3 to 6 carbon atoms, are used alone or in combination. It is preferable to add 0.1 to 3.0 % (V/V) to the medium.

If the alcohol concentration exceeds 3.0 % (V/V), the growth of the present microorganism will be inhibited.

Optimum temperature for the incubation based on the addition of alcohols is 28° to 32°C.

Now, comparative examples are given for the cases with and without the addition of alcohol to the medium.

Comparative Example 1

*Corynebacterium uratoxidans* U-23 (FERM-P NO. 789, ATCC NO. 21749) was transferred in a medium containing 1 % (W/V) meat extract, 0.1 % (W/V) potassium phosphate (monobasic), 0.02 % (W/V) magnesium sulfate, 0.001 % (W/V) ferric chloride, and 0.2 % (W/V) yeast extract and having a pH of 7.0, and incubated at 30°C under aerobic conditions for 20 hours, whereby a speed culture was prepared. The resulting seed culture was inoculated at a concentration of 1 % (V/V) in the medium containing 1 % (W/V) glycerine, 0.10 % (V/V) potassium phosphate (monobasic), 0.02 % (W/V) magnesium sulfate, 0.001 % (W/V) ferric chloride and 0.2 % (W/V) yeast extract and having a pH OF 7.0, and incubated at 32°C under aerobic conditions. After three hours from the start of incubation, 0.3 % (W/V) of uric acid was added to the medium. To another medium, 0.3 % (W/V) uric acid and 0.3 % (V/V) 2-pentanol were added at the same time also after 3 hours from the start of incubation. The incubation was continued for total 23 hours and 40 hours under aerobic conditions. The results thus obtained are shown in the following table where the case of alcohol addition is compared with the case of no addition of the alcohol. It is seen from the table that the alcohol addition has the following effects:

1. The production of uricase is promoted remarkably at the level of about 2-fold.
2. Secretion of uricase from the cells to the outside is remarkably promoted.

Thus, the alcohol addition can considerably improve the production efficiency of uricase outside the cells and consequently the recovery of uricase accumulated outside the cells can be more readily carried out.

Effect of the addition of 2-pentanol upon microbial uricase production

| Enzyme | Alcohol addition: ricase activity per 1 ml of broth (unit*) | | |
|---|---|---|---|
| | 2-pentanol (0.3 %) Total 23 hr. incubation | No addition of 2-pentanol Total 23 hr. incubation | Total 40 hr. incubation |
| Outside cells (Culture filtrates) | 2.3 (97.9%) | 0.7 (87.5%) | 1.20 (96%) |
| Within cells (Cell-free extracts**) | 0.05 (2.1%) | 0.1 (12.5%) | 0.05 (4%) |
| Total | 2.35 (100%) | 0.8 (100%) | 1.25 (100%) |

Remarks: *: Unit of uricase activity: The amount of enzyme which oxidizes 1 micromole of uric acid to allantion for one minute at 30°C in a borate buffer (pH 9.0).
**: Total activity of intracellular uricase/initial broth volume (ml.).

It seems that the action of the alcohol is to give some change to cells of the microorganisms to promote permeation of the uric acid, an inducer of uricase, into the cells and enhance the inductive production of uricase, and promote the secretion of the uricase to outside of the cells.

Generally, it is known that an organic solvent such as toluene, chloroform, ethyl acetate, etc., and a surface-active agent give some change to the surface layers of cells of the microorganisms and make the contents of cells leak from the cells. However, these chemicals are not effective at all for the present microorganisms, but only the above-mentioned alcohols have a remarkable effect.

Comparative Example 2

Effects of addition of various alcohols to the medium were studied under the same experimental conditions as in Comparative Example 1, and the results are shown in the following table.

Effects of addition of alcohols (0.3 %, V/V) on the production of extracellular uricase (unit/ml of filtrate)

| | Total 23 hr. incubation | Total 40 hr. incubation |
|---|---|---|
| n-propyl alcohol | 0.9 | 1.3 |
| iso-propyl alcohol | 0.9 | 1.5 |
| n-butyl alcohol | 1.0 | 1.2 |
| iso-butyl alcohol | 1.2 | 1.2 |
| sec-butyl alcohol | 1.3 | 1.3 |
| tert-butyl alcohol | 1.0 | 1.5 |
| n-amyl alcohol | 2.0 | 2.1 |
| iso-amyl alcohol | 2.2 | 2.1 |
| 3-methylbutanol | 0.8 | 1.3 |
| sec-amyl alcohol (diethylcarbinol) | 2.2 | 2.2 |
| sec-n-amyl alcohol (2-pentanol) | 2.3 | 2.4 |
| sec-iso-amyl alcohol | 1.5 | 1.6 |
| tert-amyl alcohol | 0.9 | 1.3 |
| sec-hexyl alcohol (methyl-iso-butylcarbinol) | 1.3 | 1.4 |
| no addition of alcohol (control) | 0.7 | 1.2 |

The conditions for incubation are the same as in Comparative Example 1, except kind of alcohols.

Similar effects of alcohol addition can be observed in other strains used in the present invention.

As explained above, it is needless to say that any process for producing uricase based on the incubation of a bacteria capable of producing uricase in a medium containing uric acid in the presence of alcohols thereby to considerably promote the production efficiency, secretion, and accumulation of uricase outside the cells is covered by the present invention.

Recovery of uricase from a culture broth containing uricase obtained according to the present invention is carried out in the following manner.

Any of the ordinary recovery methods can be used to recover the uricase from the cultured broth after the completion of incubation, but in the present invention, uricase exists mainly in the broth filtrates as the extracellular enzyme, and thus a crude enzyme solution can be obtained by removing cells from the cultured broth. Such culture filtrates or their lyophilized powders can be used as crude enzyme.

Further, the crude enzyme solution is concentrated, if necessary, and then subjected to solvent precipitation or salting-out, for example, with acetone, alcohol or ammonium sulfate, whereby a crude enzyme preparation is obtained.

When it is desired to extract the intracellular uricase for the discharge of uricase from the cells, the cells are milled or subjected to action with bacteriolytic enzyme to extract uricase according to the ordinary method, or the cells are shaken or left in the presence of toluene or the like to effect autolysis, and the resulting solution is subjected to filtration, centrifuge, or other operation thereby to remove solid matter. If necessary, nucleic acids are removed therefrom and, then, ammonium sulfate, alcohol, acetone, etc. are added thereto to effect fractionation. Then, the resulting precipitates are collected and dialyzed against a buffer solution such as a borate buffer and lyophilized, whereby a crude enzyme preparation is obtained.

To purify further the thus obtained crude enzyme preparation, the following methods can be used alone or in combination; for example, an adsorption-elution method based on an ion exchange material such as DEAE-Sephadex (diethylaminoethyl Sephadex, a trademark of Pharmacia, Sweden), DEAE-cellulose (diethylaminoethyl cellulose, TEAE-cellulose (triethylaminoethyl cellulose, etc., or a gel filtration method based on Sepbadex G-200 (a trademark of Pharmacia, Sweden), Biogel P-150 (a trademark of Biorad, USA), etc., or an adsorption-elution method based on hydroxyapatite (Biogel HT, a trademark of Biorad, USA), or an electrophoresis with polyacrylamide gel, etc. A highly purified enzyme preparation can be prepared thereby.

Now, the present invention will be explained, in detail, referring to examples.

EXAMPLE 1

800 ml. of a medium containing 1 % (W/V) glycerine, 0.1 % (W/V) potassium phosphate (monobasic), 0.02 % (W/V) magnesium sulfate, 0.001 % (W/V ferric chloride, and 0.2 % (W/V) yeast extract, pH 7 was poured into a 5-l conical flask, sterilized for 15 minutes under 1 kg/cm$^2$ of vapor pressure, and inoculated with 8 ml. of a seed culture obtained by preincubation of *Corynebacterium uratoxidans* U-23 (FERM-P NO. 789, ATCC No. 21749) in a medium having the same composition as above for 24 hours. Incubation was carried out at 34°C in a rotary shaker (150 rpm).

After 3 hours from the start of incubation, 2.4 g of uric acid suspended in 30 ml of sterilized water was added to the flask, and incubation was further continued for 40 hours, whereby 750 ml. of a broth filtrate having an uricase activity of 1.2 units/ml. was obtained.

The broth filtrate was concentrated to 150 ml. by a concentrator (Diaflow Model 401, a trademark of Amicon Corporation, USA) and 50 – 70 % (V/V) acetone precipitate fractions were collected, whereby 155 mg. of crude uricase powders was obtained. The thus obtained uricase powders had an uricase activity of about 4.1 unit/mg protein and a total uricase activity of 630 units.

EXAMPLE 2

700 ml of a medium containing 1 % (W/V) glycerine, 0.1 % (W/V) potassium phosphate (monobasic), 0.02 % (W/V) magnesium sulfate, 0.001 % (W/V) ferric chloride, and 0.2 % (W/V) yeast extract, pH 7.0 was poured into a 5-l conical flask, sterilized as same as Example 1, and inoculated with 3.5 ml. of a seed culture of *Corynebacterium uratoxidans* U-23 (FERM-P No. 789, ATCC No. 21749) preincubated for 12 hr. in a medium having the same composition as above. Incubation was carried out at 30°C by a rotary shaker (150 rpm).

2.1 g of uric acid suspended in 10 ml of 70 % (V/V) ethyl alcohol and 2.1 ml. of iso-amyl alcohol were added to the flask after 2 hours later from the start of incubation, and the incubation was further continued for 22 hours, whereby 650 ml. of a broth filtrate having an uricase activity of 2.3 units/ml was obtained.

6.5 l of the thus obtained broth filtrate (uricase activity, 2.3 units/ml) was collected and subjected to adsorption in a DEAE-cellulose column (4 × 50 cm) bufferized with a 1/25 M borate buffer solution (pH 9.0) in advance, and the column was washed with the same buffer solution. Then, the column was subjected to elution according to a sodium chloride concentration gradient elution method from 0 to 0.7 M, and uricase was eluted at a sodium chloride concentration of 0.3 to 0.45 M. These active fractions were collected, whereby 540 ml. of an enzyme solution having an uricase activity of 19.4 units/ml. was obtained.

50 – 75 % (V/V) acetone precipitate fractions from the thus obtained enzyme solution were collected and dissolved in a 1/25 M borate buffer solution (pH 9.0). Insoluble matters were separated by centrifuge, whereby 15 ml. of an enzyme solution having an uricase activity of 627 units/ml. was obtained.

Then, the enzyme solution was subjected to gel filtration by a Sephadex G-200 column (4 × 95 cm), and the uricase active fractions were collected, whereby 156 ml. of a purified enzyme solution having an uricase activity of 42.14 units/ml. and an uricase activity of 6,573 units in total was obtained. Recovery percentage of uricase activity of the purified enzyme solution from the broth filtrate was about 44 %, and the specific activity of uricase thus obtained was 23.36 units/mg. protein.

EXAMPLE 3

15 l of a medium containing 1 % (W/V glycerine, 0.1 % (W/V) potassium phosphate (monobasic), 0.02 % (W/V) magnesium sulfate, 0.001 % (W/V) ferric chloride and 0.2 % (W/V) yeast extract, pH 7.0 was poured into a 30-l jar fermentor, sterilized under a vapor pressure of 1 kg/cm$^2$ for 15 minutes, and inoculated with 200 ml. of a seed culture obtained by preincubation of *Corynebacterium uratoxidans* U-23 (FERM-P No. 789, ATCC No. 21749) in a conical flask containing a medium having the same composition as above. Incubation was carried out at 30°C under the aerobic conditions with agitation of 200 rpm and forced aeration of 10 l/min.

After 3 hours from the start of incubation, both 30 g of uric acid suspended in 100 ml. of 70 % (V/V) ethyl alcohol and 45 ml. of iso-amyl alcohol were added thereto, and the incubation was further continued for 20 hours, whereby 14.2 l of a broth filtrate having an uricase activity of 2.2 units/ml. was obtained. Total amount of thus obtained cells was 5.6 g (dry basis) and the cells were subjected to ultrasonic treatment (20 KC) for 5 minutes. Intracellular uricase activity thus obtained was 120 units/g of cells (dry basis).

14 l of the broth filtrate was passed through a DEAE-cellulose column (4 × 90 cm.) bufferized in advance with a 1/25 M borate buffer solution (pH 9.0) for adsorption. The column was washed with about 5 l of a buffer solution having the same composition as above, and then subjected to elution according to a sodium chloride concentration gradient elution method from 0

| | Corynebacterium uratoxidans | | | | | | | | |
|---|---|---|---|---|---|---|---|---|---|
| | U-8 (ATCC No. 21750[1]) | | | U-30 (ATCC No. 21751) | | | U-125 (ATCC No. 21752[1]) | | |
| Alcohol | 2-pentanol | Iso-amyl alcohol | None | 2-pentanol | Iso-amyl alcohol | None | 2-pentanol | Iso-amyl alcohol | None |
| Incubation temp. °C | 30 | 30 | 34 | 30 | 30 | 34 | 30 | 30 | 34 |
| Incubation time hr | 24 | 24 | 40 | 24 | 24 | 40 | 24 | 24 | 40 |
| Uricase activity ($\mu$/ml. of broth filtrate) | 1.8 | 1.6 | 0.8 | 1.5 | 1.9 | 1.2 | 1.9 | 1.2 | 1.0 | to 0.7 M. Uricase was eluted at a sodium chloride concentration of 0.3 to 0.45 M. These uricase active fractions were collected, whereby a purified enzyme solution having an uricase activity of 8.5 units/mg. protein and an uricase activity of 26,180 units in total was obtained. Then, the purified solution was dialyzed against a 1/50 M borate buffer solution (pH 9.0) and lyophilized, whereby about 3 g of crude uricase powders as protein was obtained.

EXAMPLE 4

*Corynebacterium uratoxidans* U-8 (ATCC No. 21750), *Corynebacterium uratoxidans* U-30 (ATCC No. 21751), and *Corynebacterium uratoxidans* U-125 (ATCC No. 21752) were incubated individually in the presence or absence of 2-pentanol or iso-amyl alcohol. The results of extracellular uricase production are shown in the following table.

The incubation was carried out in the following manner. 800 ml. of a medium having the same composition as in Example 1 was poured in a 5-l conical flask and sterilized. 8 ml. each of seed cultures of the said strains was inoculated into each flask thus prepared and incubated for each case on a rotary shaker (150 rpm) at a temperature and for a time, as shown in the following table. Addition of uric acid alone or addition of both uric acid and alcohol was carried out after 3 hours later from the start of incubation, wherein the amount of uric acid or the alcohol added was 2.4 g or 2.4 ml., respectively.

What is claimed is:

1. A process for producing uricase, which comprises (a) incubating a microorganism belonging to the species Corynebacterium uratoxidans and being capable of producing uricase as cultured in a medium containing uric acid under aerobic conditions, thereby producing and accumulating uricase in a cultured broth, (b) removing the cells of the microorganism from said cultured broth, and (c) recovering the thus-produced uricase from the culture filtrate.

2. A process according to claim 1, wherein the microorganism is a strain, *Corynebacterium uratoxidans* U-23 (FERM-P No. 789, ATCC No. 21749), U-8 (ATCC No. 21750), U-30 (ATCC No. 21751) or U-125 (ATCC No. 21752).

3. A process according to claim 1, wherein the medium contains at least one alcohol having one to eight carbons.

4. A process according to claim 3, wherein the alcohol having three to six carbons is contained in the medium.

5. A process according to claim 3, wherein 0.1 to 3.0 % (V/V) of the alcohol is contained in the medium.

6. A process according to claim 1, wherein 0.01 to 1.0 % (W/V) of uric acid is contained in the medium.

7. A process according to claim 1, wherein the incubation is carried out at a pH of 5.5 to 9.0 and a temperature of 20° to 40°C.

* * * * *